US012780255B2

(12) United States Patent
Meng et al.

(10) Patent No.: US 12,780,255 B2
(45) Date of Patent: Nov. 3, 2026

(54) CONTROL METHOD, APPARATUS, DEVICE, AND STORAGE MEDIUM FOR AUTONOMOUS DRIVING VEHICLE

(71) Applicant: Hitachi Astemo, Ltd., Hitachinaka (JP)

(72) Inventors: Yi Meng, Beijing (CN); Hideki Endo, Hitachinaka (JP); Xiangzan Meng, Beijing (CN); Yasuhiro Fuse, Tokyo (JP); Seiya Katou, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 33 days.

(21) Appl. No.: 18/864,181

(22) PCT Filed: Apr. 21, 2023

(86) PCT No.: PCT/JP2023/016012
§ 371 (c)(1),
(2) Date: Nov. 8, 2024

(87) PCT Pub. No.: WO2023/218913
PCT Pub. Date: Nov. 16, 2023

(65) Prior Publication Data

US 2025/0304114 A1 Oct. 2, 2025

(30) Foreign Application Priority Data

May 11, 2022 (CN) ........................ 202210514249.9

(51) Int. Cl.
*B60W 60/00* (2020.01)
*B60W 30/09* (2012.01)
(Continued)

(52) U.S. Cl.
CPC ........ *B60W 60/0017* (2020.02); *B60W 30/09* (2013.01); *B60W 30/0956* (2013.01);
(Continued)

(58) Field of Classification Search
CPC ............. B60W 60/0017; B60W 30/09; B60W 30/0956; B60W 50/0097;
(Continued)

(56) References Cited

U.S. PATENT DOCUMENTS 9,255,988 B2 * 2/2016 Zeng .................. G01S 13/9029
11,686,836 B2 * 6/2023 Abari ...................... G01S 17/86 342/174

(Continued)

FOREIGN PATENT DOCUMENTS

EP 3330827 A1 * 6/2018 ......... B60H 1/00742
WO WO-2020244738 A1 * 12/2020 ........ B60W 60/0015

OTHER PUBLICATIONS

International Search Report Issued in PCT Application No. PCT/JP2023/016012 dated Jul. 4, 2023, with English Translation.

(Continued)

*Primary Examiner* — Tuan C To
(74) *Attorney, Agent, or Firm* — Foley & Lardner LLP

(57) ABSTRACT

A control apparatus is provided for an autonomous driving vehicle in a restricted area. The control apparatus can acquire state information of a moving object in the restricted area. The moving object includes a non-autonomous moving object and an autonomous driving vehicle, and the non-autonomous moving object includes a pedestrian and/or a non-autonomous driving vehicle. The state information includes motion information and position information, and the motion information includes a motion direction and a motion speed. The control apparatus can determine a temporary restricted passage space based on state information of the moving object, and adjust, based on the temporary restricted passage space and state information of a current autonomous driving vehicle, traveling of the current autonomous driving vehicle.

16 Claims, 6 Drawing Sheets

(51) Int. Cl.
*B60W 30/095* (2012.01)
*B60W 50/00* (2006.01)
*G08G 1/0967* (2006.01)
*G08G 1/16* (2006.01)

(52) U.S. Cl.
CPC ... *B60W 50/0097* (2013.01); *G08G 1/096725* (2013.01); *G08G 1/096775* (2013.01); *G08G 1/164* (2013.01); *G08G 1/166* (2013.01); *B60W 2050/0056* (2013.01); *B60W 2420/403* (2013.01); *B60W 2420/408* (2024.01); *B60W 2554/402* (2020.02); *B60W 2554/4041* (2020.02); *B60W 2554/4042* (2020.02); *B60W 2554/4044* (2020.02); *B60W 2554/80* (2020.02); *B60W 2555/20* (2020.02); *B60W 2556/40* (2020.02); *B60W 2556/45* (2020.02)

(58) Field of Classification Search
CPC ... B60W 2554/402; B60W 2554/4041; B60W 2556/40; B60W 2554/4042; B60W 2554/4044; B60W 2556/45; B60W 2555/20; B60W 2554/80; B60W 2420/408; B60W 2050/0056; B60W 2420/403; G08G 1/096725; G08G 1/096775; G08G 1/164; G08G 1/166
USPC .......................................................... 701/301
See application file for complete search history.

(56) References Cited

U.S. PATENT DOCUMENTS

| | | | | |
|---|---|---|---|---|
| 12,254,249 | B1 * | 3/2025 | Cahoon | G06F 30/15 |
| 2019/0204843 | A1 | 7/2019 | Fang et al. | |
| 2020/0247399 | A1 | 8/2020 | Tanahashi et al. | |
| 2020/0247401 | A1 * | 8/2020 | Yao | G01S 17/931 |
| 2020/0339196 | A1 * | 10/2020 | Jang | B60W 40/06 |
| 2021/0261122 | A1 | 8/2021 | Packer et al. | |
| 2021/0309217 | A1 * | 10/2021 | Kim | G08G 1/165 |
| 2022/0105926 | A1 | 4/2022 | Zhang et al. | |
| 2022/0297680 | A1 * | 9/2022 | Nakanishi | G06V 20/58 |
| 2023/0252896 | A1 * | 8/2023 | Xu | G08G 1/0125 701/117 |
| 2023/0286540 | A1 * | 9/2023 | Lim | B60K 35/22 |

OTHER PUBLICATIONS

Extended European Search Report issued in European Application No. 23803395.5 dated Feb. 16, 2026 (14 Pages).

* cited by examiner

CONTROL METHOD, APPARATUS, DEVICE, AND STORAGE MEDIUM FOR AUTONOMOUS DRIVING VEHICLE

TECHNICAL FIELD

The present invention relates to a field of autonomous driving technologies, and in particular, to a method, an apparatus, an electronic device, and a computer-readable storage medium for controlling an autonomous driving vehicle in a restricted area.

BACKGROUND ART

In autonomous driving realized in a restricted area such as a port or an industrial park, in order to ensure safe traveling of an autonomous driving vehicle, usually, a dedicated vehicle passage area is prepared for the autonomous driving vehicle, and entry of a non-autonomous driving vehicle and a pedestrian into the traveling area of the autonomous driving vehicle is prohibited, thereby ensuring traveling safety of the autonomous driving vehicle.

Such an implementation method has a relatively high demand for facility conditions of a port and an industrial park, and it is necessary to implement separate operation of an autonomous driving vehicle, and a non-autonomous driving vehicle and a pedestrian. In addition, there is also a method of realizing assistance to an autonomous driving vehicle by installing a road measurement sensing unit. For example, an obstacle is detected by a laser radar and information about the obstacle is notified to the autonomous driving vehicle. Since the cost of the laser radar is very high, such a method is difficult to realize in a case where the area of the port or the industrial park is very large.

SUMMARY OF INVENTION

Technical Problem

In view of this, the present invention provides a method, an apparatus, an electronic device, and a computer-readable storage medium for controlling an autonomous driving vehicle in a restricted area that can ensure safe operation of the autonomous driving vehicle in the restricted area.

Solution to Problem

In order to solve the above technical problems, the present invention employs the following technical means.

According to an embodiment of a first aspect of the present invention, in a method of controlling an autonomous driving vehicle in a restricted area for a control center to adjust traveling of the autonomous driving vehicle, the method includes acquiring state information of a moving object in the restricted area, the moving object including a non-autonomous moving object and an autonomous driving vehicle, the non-autonomous moving object including a pedestrian and/or a non-autonomous driving vehicle, the state information including motion information and position information, the motion information including a motion direction and a motion speed, determining, based on state information of each of the moving objects, a temporary restricted passage space corresponding to the each moving object, and adjusting, based on state information of a current autonomous driving vehicle and a temporary restricted passage space corresponding to each of all other moving objects, traveling of the current autonomous driving vehicle.

Further, the acquiring state information of the moving object in the restricted area includes acquiring position information of the moving object at different times and a corresponding time, and determining the motion information of the moving object based on the acquired position information of the moving object and the corresponding time.

Furthermore, position information and a corresponding time of the moving object are acquired at predetermined time intervals, and the motion information of the moving object is determined based on the position information $D_k$ of the moving object and the corresponding time $T_k$ that are acquired at the current time, and the position information $D_{k-1}$ of the moving object and the corresponding time $T_{k-1}$ were acquired last time.

Further, the acquiring state information of the moving object in the restricted area includes acquiring position information about a position where the moving object is currently located and a corresponding time, and calculating state information of the moving object at a future predetermined time based on a Kalman filter.

Furthermore, the motion information further includes motion acceleration, and wherein the method includes determining state information of the moving object based on position information of the moving object and a corresponding time that were acquired three times including a current time.

Further, the determining, based on state information of each of the moving objects, a temporary restricted passage space corresponding to the each moving object includes determining a motion trajectory of the each moving object combined with map information in the restricted area based on the motion information, and determining, with position information of the moving object as a start point and a predetermined position after operating for a predetermined time at the operation speed toward the motion direction along the motion trajectory as an end point, the temporary restricted passage space based on the start point and the end point.

Further, the determining, based on state information of each of the moving objects, a temporary restricted passage space corresponding to the each moving object includes determining a motion trajectory of the each moving object combined with map information in the restricted area based on the motion information, and determining, with position information of the moving object as a start point and a place that is away forward by a predetermined distance toward in the motion direction along the motion trajectory as an end point, the temporary restricted passage space based on the start point and the end point.

Further, the method further includes determining a time information correspondence relationship between the moving object and the control center, determining whether there is a communication failure based on the time information correspondence relationship and position information of the moving object and a corresponding time that were acquired last time, the communication failure including a communication delay or communication interruption, determining a length of an elapsed time of the communication failure when it is determined that the communication failure exists, and correcting the temporary restricted passage space based on the length of the elapsed time of the communication failure and adjusting traveling of the autonomous moving object based on the corrected temporary restricted passage space.

Further, the correcting the temporary restricted passage space based on the length of the elapsed time of the communication failure includes determining, with a position corresponding to position information of the moving object acquired last as a start point, a predicted motion distance based on the length of the elapsed time and a motion speed of the moving object, and determining a space from the start point with the predicted motion distance as a radius and correcting the temporary restricted passage space.

The method further includes determining a space along the motion direction with the predicted motion distance as a radius and setting the space as the restricted space.

Further, the state information further including identification information, the identification information including a type of a moving object, a credit rank, the method further includes correcting the restricted space based on the identification information.

Further, the method further includes correcting the restricted space based on an environmental condition and/or a date attribute, wherein the environmental condition includes a weather condition, a lighting condition, and a road condition, and the date attribute is a working day or a holiday/day off.

Further, the adjusting traveling of the current autonomous driving vehicle based on the temporary restricted passage space and the state information of the current autonomous driving vehicle includes stopping the current autonomous driving vehicle until the temporary restricted passage space is removed when it is determined that the temporary restricted passage space exists at a predetermined distance in a forward direction based on the state information of the current autonomous driving vehicle.

Further, the adjusting traveling of the current autonomous driving vehicle based on the temporary restricted passage space and the state information of the current autonomous driving vehicle includes determining whether the moving object or a shielding object exists in the temporary restricted passage space in a case where the temporary restricted passage space exists at a predetermined distance in a direction in which the current autonomous driving vehicle moves forward, and in a case where the moving object and the shielding object do not exist, causing the autonomous driving vehicle to continue to pass, or in a case where the moving object or the shielding object exists, stopping the current autonomous driving vehicle until the temporary restricted passage space is removed.

Further, the determining whether the moving object or the shielding object exists in the temporary restricted passage space includes acquiring detection information of a sensor of the autonomous driving vehicle, the sensor of the autonomous driving vehicle being any one or several types of a camera, a radar, and a laser radar, and detecting an obstacle based on the detection information and determining whether the moving object or the shielding object exists in the temporary restricted passage space.

According to an embodiment of a second aspect of the present invention, in a control apparatus for an autonomous driving vehicle in a restricted area, the control apparatus includes an acquisition module used to acquire state information of a moving object in the restricted area, the moving object including a non-autonomous moving object and an autonomous driving vehicle, the non-autonomous moving object including a pedestrian and/or a non-autonomous driving vehicle, the state information including motion information and position information, the motion information including a direction a motion and a motion speed, calculation module that determines a temporary restricted passage space based on state information of the moving object, and an adjustment module that adjusts, based on the temporary restricted passage space and state information of a current autonomous driving vehicle, traveling of the current autonomous driving vehicle.

According to an embodiment of a third aspect of the present invention, an electronic device includes a processor and a memory, wherein the memory stores at least one instruction or at least one program, and the at least one instruction or the at least one program is loaded and executed by the processor to implement the above method.

According to an embodiment of a fourth aspect of the present invention, in a computer-readable storage medium, the computer-readable storage medium stores at least one instruction or at least one program, and the at least one instruction or the at least one program is loaded and executed by a processor to implement the above method.

Advantageous Effects of Invention

The technical means of the present invention has at least one of the following beneficial effects.

According to the method of controlling the autonomous driving vehicle in the restricted area of the embodiment of the present invention, in a case where the dedicated vehicle passage area is not set, safe operation of the autonomous driving vehicle in the restricted area can be guaranteed, and cost is low.

DESCRIPTION OF EMBODIMENTS

In order to make a person skilled in the art understand the technical means of the present invention better, the following clearly and completely describes the technical means in the embodiments of the present invention together with the drawings in the embodiments of the present invention. Apparently, the described embodiments are merely some but not all of the embodiments of the present invention. Any other embodiments obtained based on the embodiments in the present invention under the premise that a person skilled in the art does not use inventive efforts shall fall within the protection scope of the present invention.

Note that the terms "first", "second", and the like in the specification and claims and the drawings of the present invention intended to distinguish between similar objects, and do not need to be used for description in a specific order or a sequential order. It should be understood that the data used in this manner can be exchanged under appropriate circumstances so that the embodiments of the invention described herein can be implemented in other orders than those illustrated or described herein. Besides, the terms "including" and "having" and any variants thereof are intended to cover a non-exclusive inclusion, and include, for example, a series of steps or units of a process, a method, an apparatus, a product, or a device, but are not limited to those steps or units that are expressly written, but may include other steps or units that are not expressly written or that are inherent to those processes, methods, products, or devices.

Hereinafter, a method, an apparatus, an electronic device, and a medium for computer-readable storage controlling an autonomous driving vehicle in a restricted area according to an embodiment of the present invention will be described with reference to the drawings of the specification.

First, a use scene of the method of controlling the autonomous driving vehicle in the restricted area according to the embodiment of the present invention will be described with reference to FIG. 1.

Figure 1:
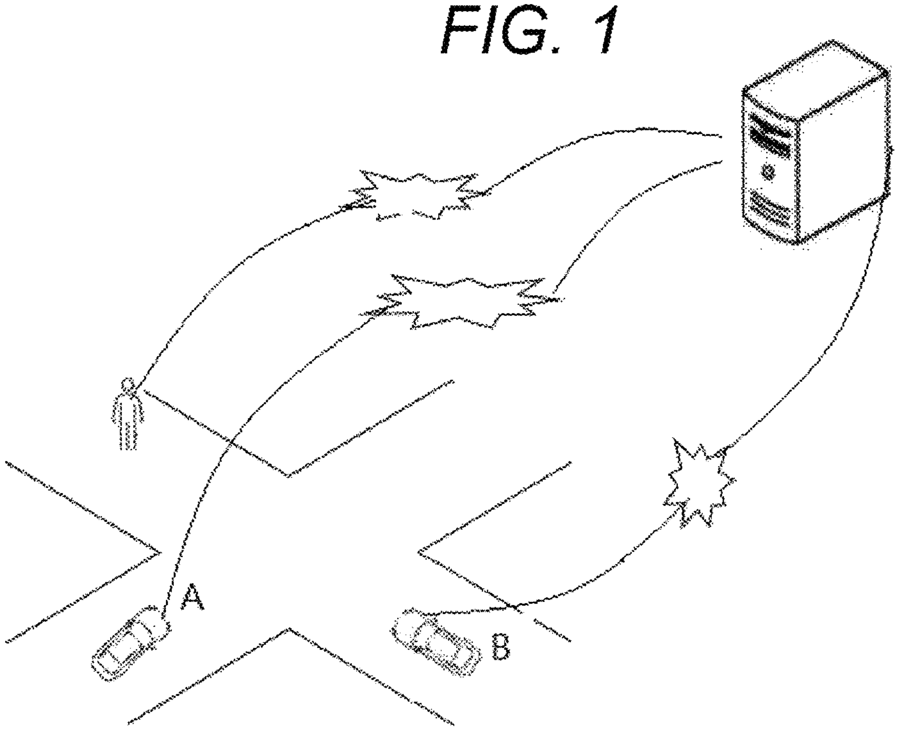
FIG. 1 is a diagram illustrating a use scene of a method of controlling an autonomous driving vehicle in a restricted area of the present invention.

FIG. 1 schematically illustrates a daily distribution situation in a restricted area. As illustrated in FIG. 1, a plurality of moving objects usually exists in the restricted area, and specifically, the moving objects relate to a person, a vehicle coming from outside A, and a current autonomous driving vehicle B. In this case, the operation of the current autonomous driving vehicle B is required to be adjusted based on the position (temporary restricted passage space) where other moving objects are located.

The so-called restricted area refers to an area having a certain area boundary, and specifically, may be, for example, an industrial park, a port, or an airport.

In these restricted spaces, walking of personnel (including employees, persons coming from outside, etc.) is related, and there may also be traveling of the extraneous vehicle regarding in a normal state. When the freight transportation or the like is performed by the autonomous driving vehicle in the restricted space, it is necessary to avoid the pedestrian ahead of the autonomous driving vehicle, the vehicle coming from outside, and the like by controlling the autonomous driving vehicle in a timely manner, that is, the pedestrian ahead of the autonomous driving vehicle and the vehicle coming from outside are regarded as an obstacle (that is, a temporary restricted passage space), and the autonomous driving vehicle is caused to temporarily stop, wait, or detour.

In addition, in a case where the restricted area is relatively large and it is necessary to operate a plurality of autonomous driving vehicles at the same time, the autonomous driving vehicle is required to further avoid other autonomous driving vehicles at this time.

That is, the current autonomous driving vehicle operating in the industrial park is required to adjust its operation according to the temporary restricted passage space generated by any other moving objects so as to ensure safe traveling.

Hereinafter, a method of controlling an autonomous driving vehicle in a restricted area according to an embodiment of the present invention will be first described with reference to the drawings.

Figure 2:
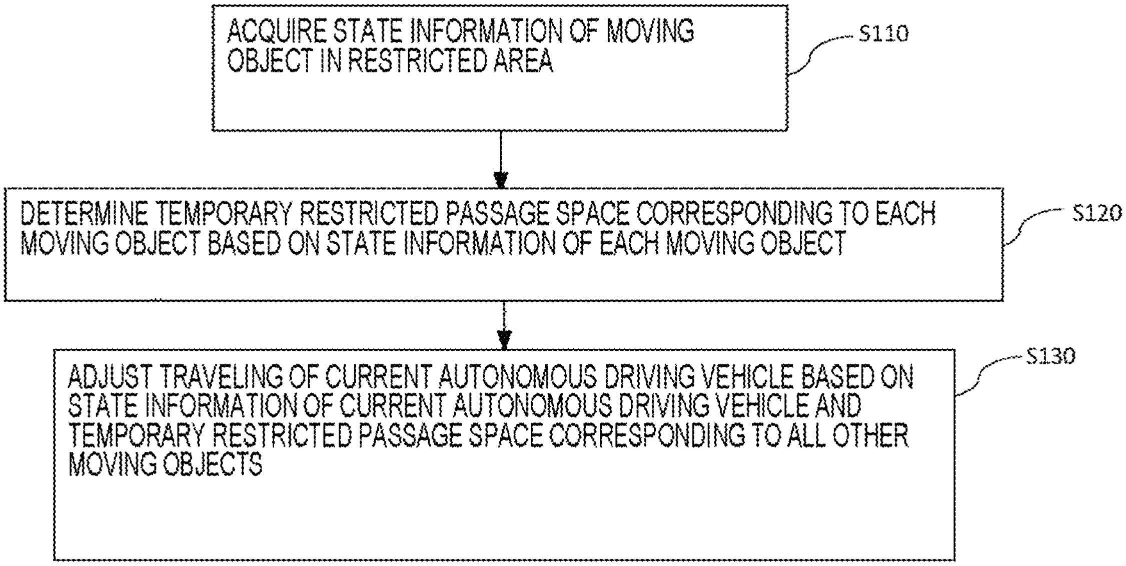
FIG. 2 is a flowchart of a method of controlling an autonomous driving vehicle in a restricted area provided by an embodiment of the present invention.

FIG. 2 shows a flowchart of a method of controlling an autonomous driving vehicle in a restricted area according to an embodiment of the present invention. The method is used by a control center to adjust traveling of an autonomous driving vehicle. The method may include S110: acquiring a state (including a position and motion information) of each moving object, S120: calculating a temporary restricted passage space corresponding to each moving object, and S130: controlling a current autonomous driving vehicle to avoid the temporary restricted passage space corresponding to other moving objects.

Hereinafter, each of the above steps will be described in more detail with reference to FIGS. 2 to 11.

S110 includes acquiring state information of a moving object in the restricted area, the moving object including a non-autonomous moving object and an autonomous driving vehicle, the non-autonomous moving object including a pedestrian and/or a non-autonomous driving vehicle, the state information includes motion information and position information, and the motion information including a motion direction and a motion speed.

In the embodiment of the present invention, the moving object in the restricted area further includes a non-autonomous moving object, for example, a pedestrian, a non-autonomous driving vehicle, except for an autonomous driving vehicle. During a process of controlling the autonomous driving vehicle, it is necessary to ensure that the autonomous driving vehicle can avoid any other moving objects. Therefore, it is necessary to acquire state information of all moving objects including the current autonomous driving vehicle and other moving objects in the process of controlling. Among them, the state information of the other moving objects is used to determine whether the other moving objects are present at a predetermined distance in the direction in which the current autonomous driving vehicle moves forward, the state information of the current autonomous driving vehicle can determine its own state, and it is determined whether it is necessary to adjust the operation of the current autonomous driving vehicle by combining the both pieces of state information.

The so-called state information includes position information and motion information.

That is, the position information is used to determine a specific position where the moving object is within the restricted area. In order to acquire the position information, the position information can be acquired by a terminal included in the moving object itself, and for example, the position information can be acquired by a terminal apparatus carried by the moving object itself. For example, the position information can be acquired by a sports wristwatch, a mobile phone, or the like carried by the pedestrian. The position information may be transmitted to the control center after the sports wristwatch, the wristwatch, or the like acquires the position information. For the vehicle, for example, the position information may be acquired by the in-vehicle device and transmitted to the position center.

In addition, the positioning terminals may be disposed on all the moving objects in the restricted area. The positioning terminal may include, for example, a calculation unit, a memory, a positioning unit, a battery, a communication unit, a display unit, and the like. The positioning unit includes a positioning manner such as Big Dipper, GPS, or RTK, and may acquire position information of a point on which the positioning unit itself is located. The communication unit can implement mobile communication such as 4G and 5G. The position information of the positioning terminal may be transmitted to the control center at the distal end by the communication unit. For example, in a case where the moving object arrives at an entrance of the restricted area, a corresponding positioning terminal is assembled to set the positioning terminal in an online state, online information is transmitted from the positioning terminal to the control center, and the control center starts tracking and recording a location of the positioning terminal. In a case where the moving object reaches the exit after stopping traveling in the restricted area, the positioning terminal transmits offline information to the control center, and the control center ends tracking and recording to the position of the positioning terminal.

In addition, so-called motion information includes a motion direction and a motion speed. Among them, regarding the motion speed, for the pedestrian, for example, the motion speed can be directly transmitted to the control center after being calculated by a conventional terminal such as a sports wristwatch, and for the vehicle, for example, the vehicle traveling speed obtained by being calculated by the in-vehicle device can be transmitted to the control center. In addition, the motion direction can be determined based on position information at times before and after.

Figure 3:
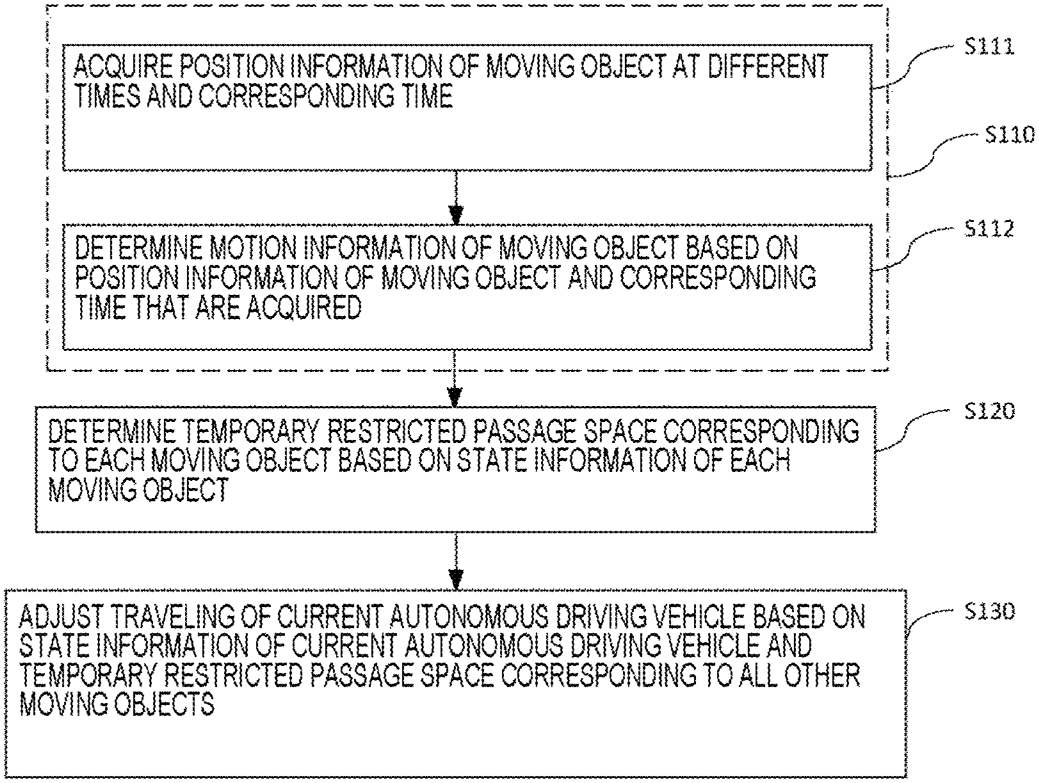
FIG. 3 is a flowchart of a method of controlling an autonomous driving vehicle in a restricted area provided by another embodiment of the present invention.

In addition, as one specific example, as illustrated in FIG. 3, the state information can be acquired via acquiring position information of the moving object at different times and a corresponding time, and determining the motion information of the moving object based on the position information of the moving object and the corresponding that are acquired. That is, the positioning terminal transmits the position information to the control center, and at the same time, further transmits the corresponding time. The control center acquires position information of the moving object at two different times and a corresponding time at regular time intervals, and then can determine the motion speed and the motion direction of the moving object by the simplest calculation based on the plurality of pieces of position information and the corresponding times. Of course, in order to acquire a more accurate motion direction, the motion direction is further corrected together with the map, that is, the passable road displayed on the map, the motion trajectory is determined based on the corrected motion direction, and the motion speed can be calculated. More specifically, the position information of the moving object and the corresponding time are acquired at predetermined time intervals, and the motion information of the moving object is determined based on the position information $D_k$ of the moving object and the corresponding time $T_k$ that are acquired at the current time, and the position information $D_{k-1}$ of the moving object and the corresponding time $T_{k-1}$ that are acquired at the previous time. That is, the position information of the moving object and the corresponding time are acquired once every predetermined time interval, and the motion direction and the motion constantly corrected with the position information and the corresponding time most recently acquired two times, whereby the motion information of the moving object can be corrected in real time, and the state information of each moving object can be determined more accurately.

Figure 4:
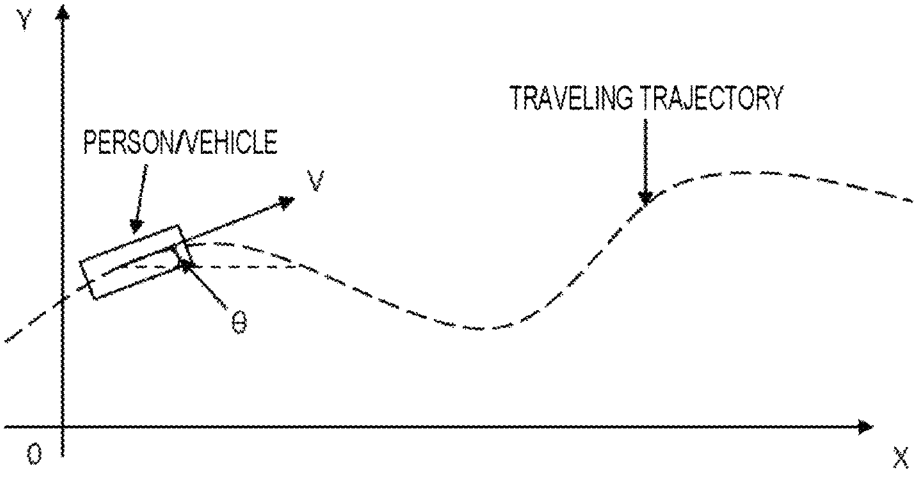
FIG. 4 is a diagram illustrating a motion trajectory of a moving object provided by an embodiment of the present invention.

More specifically, as illustrated in FIG. 4, the origin of the plane coordinate system and the positive directions of the X axis and the Y axis corresponding to the restricted area of the autonomous driving vehicle operation are defined. After the geoposition information (for example, longitude and latitude) of the moving object is acquired by the positioning terminal, the information is converted into coordinate values in the XOY coordinate system, and is converted into, for example, center coordinates (Xc, Yc) of the moving object. The speed of the vehicle is expressed by (V, θ) or $(V_x, V_y)$, where V is a magnitude of the motion speed, θ is an angle formed by the speed direction with the positive direction of the X axis, and $V_x$ and $V_y$ are magnitudes of the amount of the motion speed in the X axis and the Y axis, respectively.

Assuming that the coordinates of the positioning terminal are $(x_{k-1}, y_{k-1})$ and $(x_k, y_k)$ at k−1 time and k time, respectively, and that the time interval between k−1 time and k time is ΔT, the speed of the positioning terminal is obtained by the following expressions:

$$V = \frac{\sqrt{(x_k - x_{k-1})^2 + (y_k - y_{k-1})^2}}{\Delta t}, \quad \text{[Math 1]}$$

$$\theta = \text{arc sin}\frac{y_k - y_{k-1}}{\sqrt{(x_k - x_{k-1})^2 + (y_k - y_{k-1})^2}}, \quad \text{[Math 2]}$$

At the same time, the magnitudes of amounts of V in the X-axis direction and the Y-axis direction are obtained by the following expressions:

$$v_x = \frac{x_k - x_{k-1}}{\Delta t}, \quad \text{[Math 3]}$$

$$v_y = \frac{y_k - y_{k-1}}{\Delta t}, \quad \text{[Math 4]}$$

In addition, it is possible to further estimate the state information of the moving object at a future predetermined time based on the Kalman filter based on the current state information (including the position information and the motion information) of the moving object.

The Kalman filter is an algorithm that performs linear least mean square error estimation for a dynamic system, and is divided into two parts of prediction and update for the system.

The prediction is calculated by the following system state estimation equation:

$$x'_k = Ax_{k-1} + Bu_k \quad \text{[Math 5]}$$

where $x'_k$ is a system state vector for k-time prediction. $x_{k-1}$ is a state vector of the k−1 time system, and the system state vector includes $(p_x, p_y, v_x, v_y)_T$, where $p_x$, $p_y$, $v_x$, and $v_y$ represent coordinates and speeds in the X-axis and Y-axis directions in the plane coordinate system of the positioning terminal.

Assuming that the motion of the object is a uniform linear motion within ΔT time, $Bu_k=0$, and the state transition matrix A is obtained by the following expression:

$$A = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix} \quad \text{[Math 6]}$$

The calculation formula of the error covariance of the prediction portion is represented by the following expression:

$$P'_k = AP_{k-1}A^T + Q_k \quad \text{[Math 7]}$$

where $P'_k$ and $P_{k-1}$ are error covariance matrices of $x'_k$ and $x_{k-1}$, respectively, and $Q_k$ is a covariance matrix of k-time system random interference noise.

The system state equation of the update portion is represented by the following expression:

$$x_k = x'_k + K_k(z_k - H_k x'_k) \quad \text{[Math 8]}$$

where $x_k$ is a state vector of the k-time system and Kk is the Kalman gain. $z_k$ is a system observation amount, and specifically, in the present application, for example, position information obtained by GPS, RTK, or the like, that is, $z_k=(P_x, P_y)^T$. $H_k$ is an observation matrix and reflects a transformation relationship between a state vector and an observation quantity, so that $$H_k = \begin{pmatrix} 1 & 0 & 0 & 0 \\ 0 & 1 & 0 & 0 \end{pmatrix} \quad \text{[Math 9]}$$

The calculation formula of the Kalman gain coefficient of the update portion is represented by the following expression:

$$K_k = P'_k H_k^T \left(H_k P'_k H_k^T + R_k\right)^{-1} \quad \text{[Math 10]}$$

where $R_k$ is a covariance matrix of k-time system observation noise. The numerical value reflects error information of the sensor, and can be determined by a performance parameter of the positioning sensor.

The covariance correction equation for the updated portion is represented by the following expression:

$$P_k = P'_k - K_k H_k P'_k \quad \text{[Math 11]}$$

The position and the speed of each moving object at a future predetermined time can be predicted based on the current position information of each moving object obtained in the control center by the iterative calculation of each expression described above.

In an embodiment, considering that the moving object may have an acceleration movement, the motion information may further include a motion acceleration.

By way of example, for a vehicle, the motion acceleration may be acquired by a terminal device, such as, for example, a gyroscope of the vehicle, and transmitted to a control center. In addition, the control center can further determine the state information of the moving object based on the position information of the moving object and the corresponding time that were acquired three times including the current time. That is, first, one motion speed may be obtained based on the position information and the corresponding time previously acquired two times, and then another motion speed may be obtained based on the position information and the corresponding time subsequently acquired two times, and then a motion acceleration may be obtained based on the motion speed acquired two times.

It is possible to know whether the moving object is performing the acceleration motion or the deceleration motion based on the motion acceleration, and it is possible to further correct and calculate a specific position of the moving object at the expected next time based on the information, that is, it is possible to more accurately determine whether the moving object obstructs the current autonomous driving vehicle, and it is possible to further improve safety.

S120 includes determining a temporary restricted passage space corresponding to each of the moving objects based on the state information of each of the moving objects.

That is, after the position information and the motion information of the moving object are acquired, next, the temporary restricted passage space corresponding to each of the moving objects is determined based on the acquired position information and motion information.

The temporary restricted passage space of the moving object refers to an area that the current autonomous driving vehicle is required to avoid. That is, the area is an area through which any other moving objects except the current autonomous driving vehicle can pass.

There are various methods for determining the temporary restricted passage space corresponding to the moving object based on the state information of the moving object.

Figure 5:
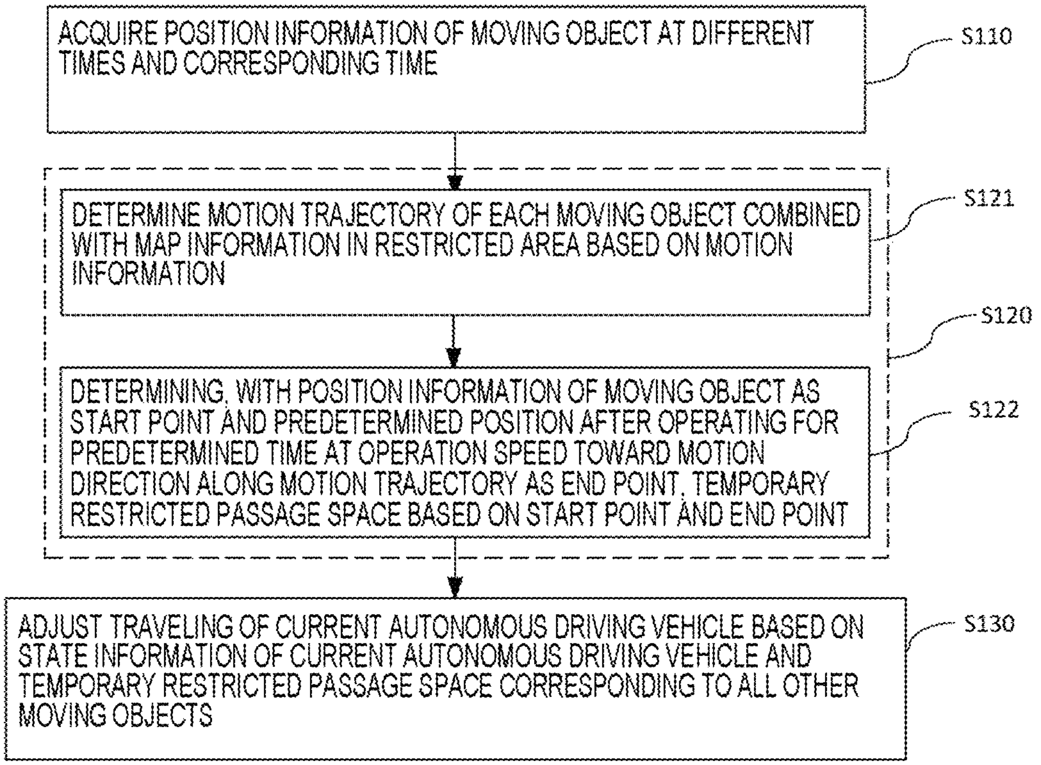
FIG. 5 is a flowchart of a method of controlling an autonomous driving vehicle in a restricted area provided by another embodiment of the present invention.

As shown in FIG. 5, in an embodiment of the present invention, the determining, based on state information of each of the moving objects, a temporary restricted passage space corresponding to the each moving object includes determining a motion trajectory of the non-autonomous moving object combined with map information in the restricted area based on the motion information, and determining, with position information of the moving object as a start point and a predetermined position after operating for a predetermined time at the operation speed toward the motion direction along the motion trajectory as an end point, the temporary restricted passage space based on the start point and the end point.

That is, after the position information, the motion speed, and the motion direction of the moving object are acquired at a certain time, it is assumed that the motion speed and the motion direction of the moving object are invariable within a predetermined time, an area through which the moving object passes within this time zone is calculated, and combined with map information in the restricted area, an area through which the non-autonomous moving object can pass, that is, a temporary restricted passage space is obtained.

Figure 6:
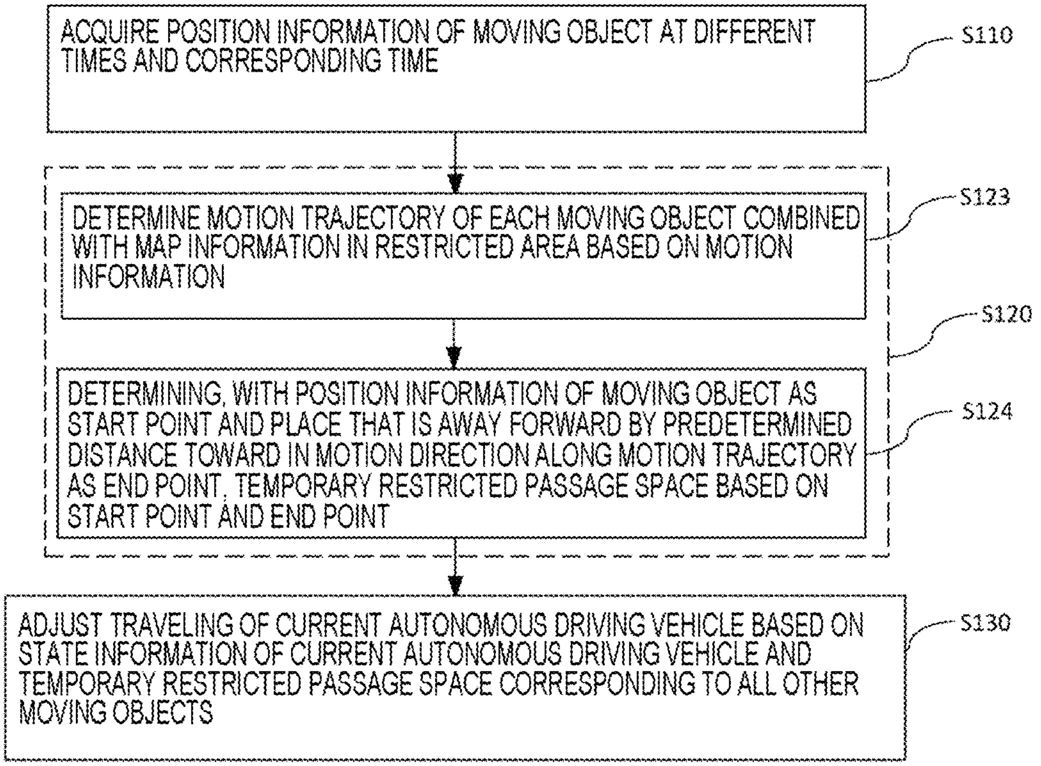
FIG. 6 is a flowchart of a method of controlling an autonomous driving vehicle in a restricted area provided by another embodiment of the present invention.

As shown in FIG. 6, in another embodiment of the present invention, the determining, based state information of each of the moving objects, a temporary restricted passage space corresponding to the each moving object includes determining a motion trajectory of the non-autonomous moving object combined with map information in the restricted area based on the motion information, and determining, with position information of the moving object as a start point and a place that is away forward by a predetermined distance toward in the motion direction along the motion trajectory as an end point, the temporary restricted passage space based on the start point and the end point.

That is, after the position information, the motion speed, and the motion direction of the moving object are acquired at a certain time, an area that extends forward by a predetermined distance (for example, in the case of a pedestrian, it may extend 3 meters forward, and in the case of a vehicle, it may extend 6 meters forward) and the moving object can pass at the next time is calculated. Among them, the predetermined distance can be set based on experience, and for example, the maximum distance that the moving object in the history data has reached at the motion speed is set as the predetermined distance. At one time, since there is a problem in the communication signal, there is a communication failure between the moving object and the control center, which may cause, for example, a communication delay, communication interruption, and the like. Accordingly, there is a possibility that there is a time deviation in the received state information of the moving object, and when the state information is received, it is not possible to accurately correspond to the real-time state of the moving object, and when the state information is not corrected, safety may be affected.

Therefore, in an embodiment of the present invention, the method further includes determining a time information correspondence relationship between the moving object and the control center, determining whether there is a communication failure including communication delay or communication interruption based on the time information correspondence relationship and position information of the moving object and a corresponding time that were acquired last time, determining a length of an elapsed time of the communication failure when it is determined that the communication failure exists, and correcting the temporary restricted passage space based on the length of the elapsed time of the communication failure and adjusting traveling of the autonomous moving object based on the corrected temporary restricted passage space.

The time information correspondence relationship between the moving object and the control center may be a synchronization relationship or a relationship having a certain time difference instead of synchronization.

As an example, for example, the control center and the positioning terminal on the moving object may be subjected to time synchronization processing, specifically, the time of the positioning terminal may be set to the time of the control center, or both the control center and the positioning terminal may be synchronized with a time report standard by a third party.

When the positioning terminal on the moving object transmits information, the positioning terminal presses a time stamp, and based on the time stamp, when the control center acquires positioning information from the positioning terminal, the control center compares the time stamp of the positioning information with the time of the control center, and determines whether there is a communication failure based on the comparison, to determine the length of the elapsed time of the communication failure. For example, when it is indicated that the difference between the time stamp information indicated in the received positioning information and the time at the time of the positioning information received by the control center is 0.5 seconds, it is expressed that the time of the communication failure is 0.5 seconds.

In an embodiment of the present invention, the correcting the temporary restricted passage space based on the length of the elapsed time of the communication failure includes determining, with a position corresponding to position information of the moving object acquired last as a start point, a predicted motion distance based on the length of the elapsed time and a motion speed of the moving object, and determining a space from the start point with the predicted motion distance as a radius and correcting the temporary restricted passage space.

Among them, the method of determining the space can be selected according to a specific situation. In a possible embodiment of the present invention, a space is determined along the motion direction with the predicted motion distance as a radius, and is set as the restricted space. That is, a sector area having a predetermined angle, for example, 120° is determined with the position coordinates of the moving object as a spot and the predicted motion distance as a radius.

Figure 7:
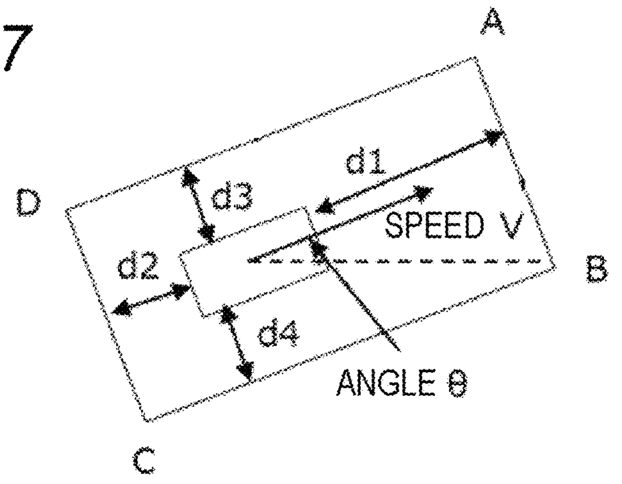
FIG. 7 is a diagram for describing determining a corresponding temporary restricted passage space based on state information of a moving object in an embodiment of the present invention.

Hereinafter, the determination of the temporary restricted passage space will be described in more detail with reference to FIG. 7.

First, a process of calculating a temporary restricted passage space based on a speed and a direction of a vehicle will be described using a non-autonomous driving vehicle as an example. The center coordinates (Xc, Yc) of the vehicle, the size (w, l) of the vehicle, the speed (V, θ) of the vehicle, and the communication delay Δt can be acquired by the positioning terminal.

Assume that safety distances around the vehicle are d1, d2, d3, and d4, where d1 is a safety distance away from the vehicle in the vehicle forward direction, d2 is a safety distance behind a direction in which the vehicle moves forward, and d3 and d4 are safety distances on the left and right sides with respect to a direction in which the vehicle moves forward.

The size of d1 is related to the vehicle speed, and a distance by which the vehicle moves forward within to time is defined as a temporary restricted passage space. That is, d1=$v*t_0$, for example, to can be taken as 2 seconds, and a distance range in which the vehicle moves forward within 2 seconds in the forward direction of the vehicle is set in part of the temporary restricted passage space. d2, d3, d4 can be set to fixed values depending on the situation of the site, for example fixed at 3 meters, 1 meter, 1 meter, respectively. Therefore, the calculation formula of the size of the temporary restricted passage space is represented by the following expression:

$$\text{Length} = 1 + V*(t_0+\Delta t) + 3$$
$$\text{Width} = w + 1 + 1 = w + 2,$$

and the coordinates of the four vertexes A(X1, Y1), B(X2, Y2), C(X3, Y3), and D(X4, Y4) of the section closed by the above setting can be calculated by the following expression:

$$X1 = Xc + (l/2 + d1)*\cos\theta - (w/2 + d3)*\sin\theta = Xc + (l/2 + v*(t_0+\Delta t))*\cos\theta - (w/2+1)*\sin\theta,$$

$$Y1 = Yc + (l/2 + d1)*\sin\theta + (w/2 + d3)*\cos\theta = Xc + (l/2 + v*(t_0+\Delta t))*\sin\theta + (w/2+1)*\cos\theta,$$

$$X2 = Xc + (l/2 + d1)*\cos\theta + (w/2 + d4)*\sin\theta =$$

-continued $$Xc + (1/2 + v*(t_0 + \Delta t))*\cos\theta + (w/2 + 1)*\sin\theta,$$

$$Y2 = Yc + (1/2 + d1)*\sin\theta - (w/2 + d4)*\cos\theta =$$

$$+(1/2 + v*(t_0 + \Delta t))*\sin\theta - (w/2 + 1)*\cos\theta,$$

$$X3 = Xc - (1/2 + d2)*\cos\theta + (w/2 + d4)*\sin\theta =$$

$$Xc + (1/2 + 3)*\cos\theta + (w/2 + 1)*\sin\theta,$$

$$Y3 = Yc + (1/2 + d2)*\sin\theta - (w/2 + d4)*\cos\theta =$$

$$Xc + (1/2 + 3)*\sin\theta - (w/2 + 1)*\cos\theta,$$

$$X4 = Xc - (1/2 + d2)*\cos\theta - (w/2 + d3)*\sin\theta =$$

$$Xc + (1/2 + 3)*\cos\theta - (w/2 + 1)*\sin\theta,$$

$$Y4 = Yc + (1/2 + d2)*\sin\theta + (w/2 + d3)*\cos\theta =$$

$$Xc + (1/2 + 3)*\sin\theta + (w/2 + 1)*\cos\theta.$$

The temporary restricted passage space may be represented in a sealed polygon in the control center, and the temporary restricted passage space may be recorded by recording continuous vertices. At this time, the temporary restricted passage space can be represented by points A(X1, Y1), B(X2, Y2), C(X3, Y3), D(X4, Y4), and A(X1, Y1).

When a communication delay occurs, it can be easily set so that the vehicle still travels in the original direction. In the case of communication interruption, since the time is relatively long, there is a relatively large possibility that a direction in which the vehicle moves forward changes, so that the speed of the vehicle is assumed to be unchanged, but the direction is in a fan-shaped area in which the initial direction is the central direction. For example, the angles formed between the initial direction and the fan-shaped left boundary and between the initial direction and the fan-shaped right boundary are each set to 60°, and the fan-shaped radius $R=V*(t_0+\Delta t)$. In a case where the communication delay time is relatively long, the size of the vehicle can be ignored when calculating the temporary restricted passage space. The vertical angle of the fan shape can be 120°.

Next, a process of calculating a temporary restricted passage space corresponding to a pedestrian, for example, an employee of a company will be described. It can be seen from the positioning terminal that the center coordinates of the pedestrian are (Xc, Yc) and the speed of the pedestrian is V. Because a speed of a pedestrian is relatively low, a fixed circular area around a person may be a temporary restricted passage space, and a radius of the circle is R: Radius=$v*(t_0+\Delta t)$. In a case where the temporary restricted passage space is the fan shape or the circular shape, the temporary restricted passage space can be represented by a closed polygon, that is, the temporary restricted passage space can be represented by approximating the closed curve by recording a plurality of vertexes on the curve.

To further optimize the temporary restricted passage space after correction, in an embodiment of the present invention, the state information further includes identification information, and the identification information includes a type of a moving object, a credit rank, and the method further includes correcting the restricted space based on the identification information.

For example, for a pedestrian, the identification information may be represented, for example, by type and credit rank. In terms of type, pedestrians can be divided into an employee or a temporary employee or a person coming from outside. Employees have received good safety training and can strictly comply with traffic rules, temporary employees have received safety training for more or less time, and are less familiar with traffic rules, so there is a possibility of violating certain rules, and persons coming from outside are even more likely to violate the rules. In addition, in the past in consideration that not all the employees comply with the traffic rules and based on a situation in which the employee has violated a rule, it is possible to determine a credit rank of the employee.

In addition, for the vehicle, the type in the identification information indicates that the vehicle belongs to a non-autonomous driving vehicle coming from outside, an internal non-autonomous driving vehicle, and an internal autonomous driving vehicle. Normally, the probability that the non-autonomous driving vehicle coming from outside, the internal non-autonomous driving vehicle, and the internal autonomous driving vehicle comply with the traffic rules gradually increases in the order. In addition, the credit rank can be determined based on the probability that the vehicle has violated a rule in the past.

It has been proved that the higher the probability of complying with the traffic rules, the higher the reliability of the motion information obtained by the estimation. That is, when the temporary restricted passage space is determined, the determined section may be relatively small. Conversely, the higher the probability of violating the traffic rules, the comparatively speaking, the larger the corresponding temporary restricted passage space is required to be so as to ensure safety.

Figure 8:
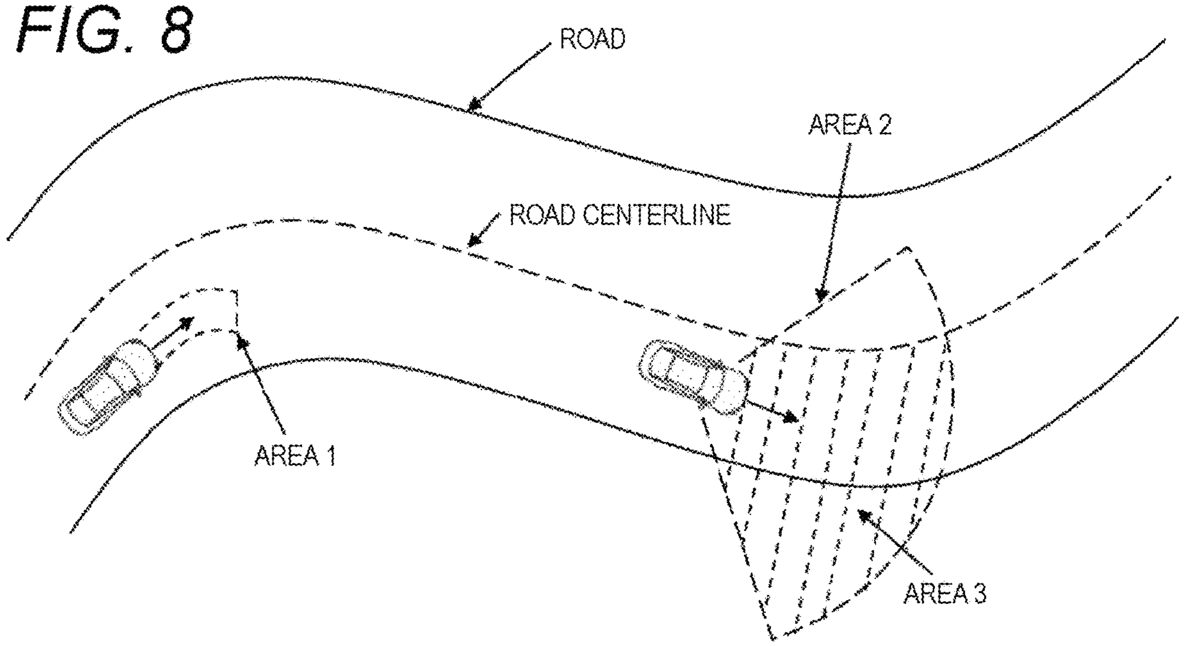
FIG. 8 is a diagram illustrating a temporary restricted passage space of a non-autonomous driving vehicle provided by an embodiment of the present invention.

For example, as shown in FIG. 8, the area 1 is a temporary restricted passage space when there is no communication failure in the non-autonomous driving vehicle, and since the control center grasps the real-time position information of the vehicle, the temporary restricted passage space of the non-autonomous driving vehicle on the left side is relatively small. The right area 2 (entire fan area) is a temporary restricted passage space when there is a communication failure, and has a relatively large range after the temporary restricted passage space is corrected.

In addition, traffic rules do not allow the non-autonomous driving vehicle to cross the centerline of the roadway. Therefore, it is possible to obtain the area 3 (that is, a portion indicated by a dotted line in the area 2) in the figure by further correcting the temporary restricted passage space so as to remove a portion on the left side of the centerline combined with the map information given on the map.

Figure 9:
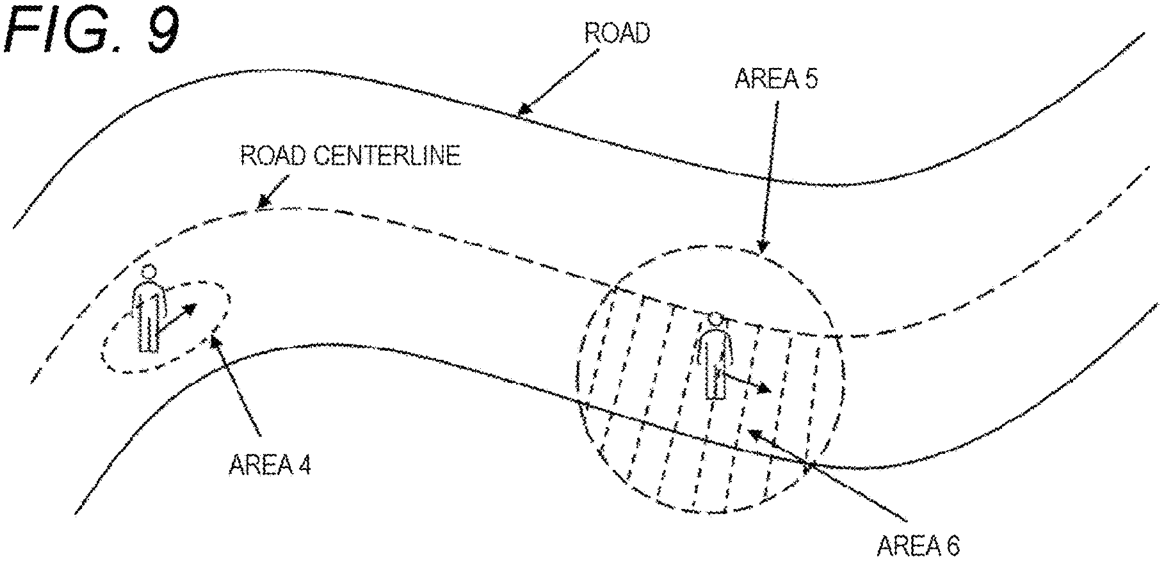
FIG. 9 is a diagram illustrating a temporary restricted passage space of a pedestrian provided by an embodiment of the present invention.

As shown in FIG. 9, the area 4 is a temporary restricted passage space when there is no communication failure for the pedestrian, and since the control center grasps the real-time position information of the pedestrian, the temporary restricted passage space for the pedestrian on the left side is relatively small. The area 5 on the right side is a temporary restricted passage space when there is a communication failure, and has a relatively large range after the temporary restricted passage space is corrected. The traffic rules do not allow pedestrians to cross the centerline of the road. Employees can strictly comply with these rules, but temporary employees with relatively low credit ranks cannot strictly comply with these rules, and may cross the centerline of the road. Therefore, when the pedestrian is a temporary employee with a relatively low rank, it is not necessary to correct the temporary restricted passage space. When the pedestrian is an employee, the temporary restricted passage space can be restricted to an area where the pedestrian can pass in the forward direction, that is, the area 6 in the figure.

In some possible embodiments of the invention, the restricted space can be further corrected based on environmental conditions and/or date attributes. Among them, the environmental condition includes a weather condition and a lighting condition, and the date attribute is a working day or a holiday/day off. For example, regarding the weather condition, in a case where visibility is poor due to fog, rain, or the like and a safe travel distance is relatively short, the temporary restricted passage space can be appropriately increased. In addition, the safety required for different date attributes is different, and the temporary restricted passage space may be corrected based on this.

Figure 10:
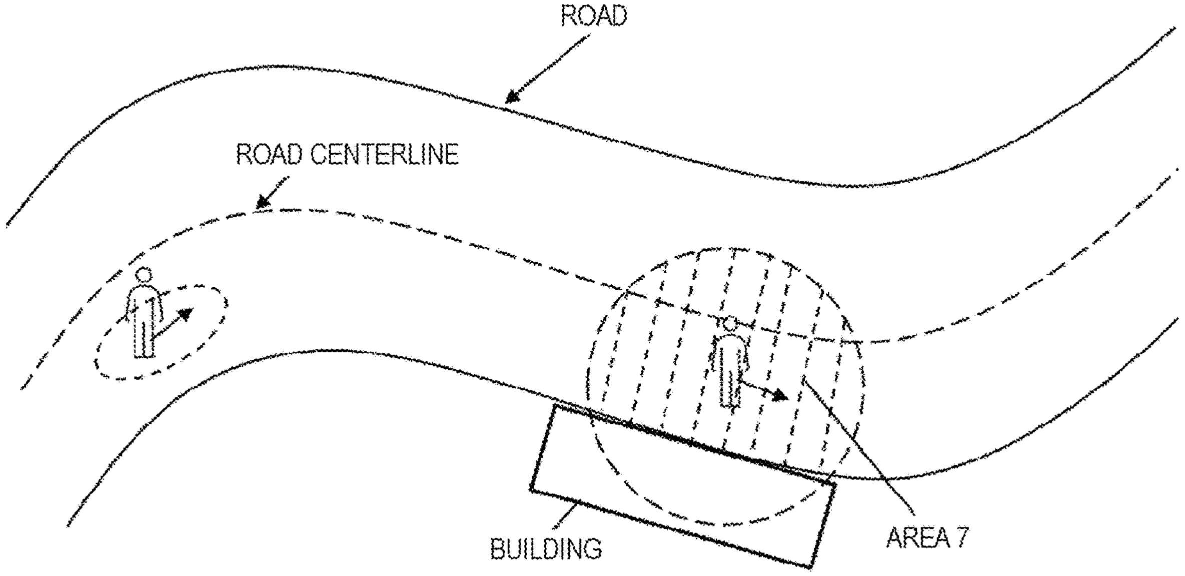
FIG. 10 is a diagram illustrating a temporary restricted passage space of a pedestrian provided by an embodiment of the present invention.

For example, as illustrated in FIG. 10, a construction article exists on one side of a pedestrian in the figure, and the pedestrian cannot pass through. Therefore, the temporary restricted passage space corrected based on the road condition is shown in the area 7.

S130 includes adjusting traveling of the current autonomous driving vehicle based on state information of the current autonomous driving vehicle and the temporary restricted passage space corresponding to all other moving objects.

That is, after the state information of all the moving objects is acquired and the temporary restricted passage space corresponding to each moving object is determined, the traveling of the current autonomous driving vehicle is adjusted based on the state information of the current autonomous driving vehicle and the temporary restricted passage space corresponding to all the other moving objects.

In an embodiment of the present invention, step S130 includes stopping the current autonomous driving vehicle until the temporary restricted passage space is removed when it is determined that the temporary restricted passage space exists at a predetermined distance in a forward direction based on state information of the current autonomous driving vehicle.

That is, when it is found that the temporary restricted passage space exists at the predetermined distance in the direction in which the current autonomous driving vehicle moves forward, the current autonomous driving vehicle is stopped until the other moving objects move away.

In another embodiment of the present invention, step S130 further includes, in a case where the temporary restricted passage space exists at a predetermined distance in a direction in which the current autonomous driving vehicle moves forward, further determining whether there is a moving object or a shielding object that shields the moving object in the temporary restricted passage space, and in a case where the moving object and the shielding object do not exist, continuing to cause the autonomous driving vehicle to pass, and in a case where the moving object or the shielding object exists, stopping the current autonomous driving vehicle until the temporary restricted passage space is removed.

Figure 11:
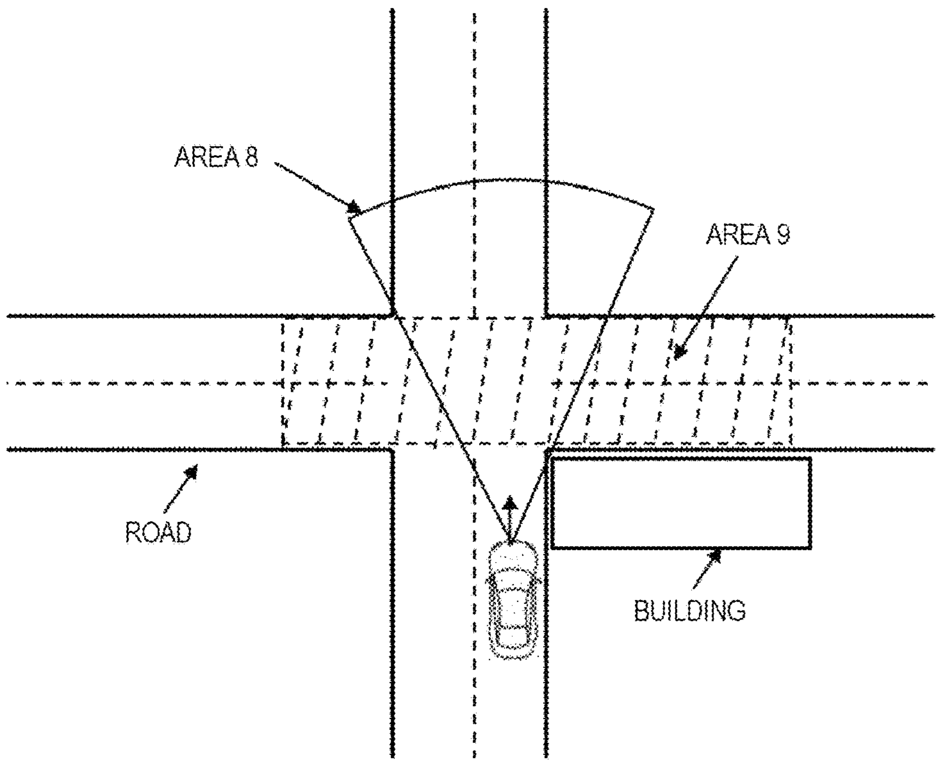
FIG. 11 is a diagram illustrating autonomous driving vehicle travel provided by an embodiment of the present invention.

Among them, the shielding object may be a tree, a building, or the like. For example, the autonomous driving vehicle can include a detection apparatus, and it is possible to detect whether a moving object or a shielding object exists within a prescribed range. As illustrated in FIG. 11, the area 8 is a detection range of the detection apparatus, and the area 9 is a temporary restricted passage space determined based on state information of each moving object. In a case where the autonomous driving vehicle is traveling straight, whether a moving object or a shielding object exists in the front temporary restricted passage space is further detected by the detection apparatus, and in a case where the moving object and the shielding object are not present, the vehicle can go forward. When the autonomous driving vehicle curves to the right, the detection apparatus cannot detect the right side area because it is blocked by the building on the right side. Therefore, the vehicle cannot pass through the temporary restricted passage space on the right side, and it is required to park and wait until the temporary restricted passage space is removed.

Examples of the detection apparatus may include a detection apparatus such as a camera, a radar, or a laser radar.

In a possible embodiment of the present invention, the determining whether the moving object exists in the temporary restricted passage space includes acquiring detection information of the autonomous driving vehicle, and performing detection and identification of an obstacle based on the detection information and determining whether the moving object or a shielding object that shields the moving object exists in the temporary restricted passage space.

Hereinafter, a control apparatus for the autonomous driving vehicle in a restricted area of the present application will be described with reference to FIG. 12.

Figure 12:
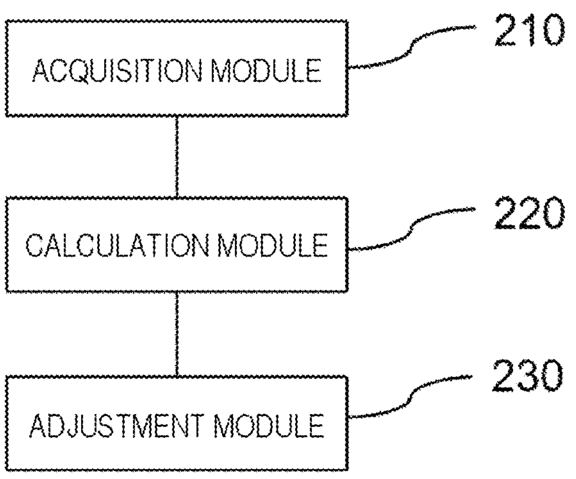
FIG. 12 is a diagram illustrating a structure of a control apparatus of an autonomous driving vehicle in a restricted area provided by an embodiment of the present invention.

As shown in FIG. 12, a control apparatus for an autonomous driving vehicle in a restricted area according to an embodiment of the present invention includes an acquisition module 210 used to acquire state information of a moving object in the restricted area, the moving object including a non-autonomous moving object and an autonomous driving vehicle, the non-autonomous moving object including a pedestrian and/or a non-autonomous driving vehicle, the state information including motion information and position information, the motion information including a motion direction and a motion speed, a calculation module 220 that determines a temporary restricted passage space based on state information of the moving object, and an adjustment module 230 that adjusts, based on the temporary restricted passage space and state information of a current autonomous driving vehicle, traveling of the current autonomous driving vehicle.

Note that the apparatus provided by the above embodiment will be described only by the division of each of the above functional modules as an example when realizing the function. In actual use, the functions described above are allocated as necessary and completed in different functional modules, that is, the internal structure of the device is divided into different functional modules to complete all or some of the functions described above. In addition, the apparatus provided by the foregoing embodiments and the corresponding method embodiments belong to a same concept, and for details of a specific implementation process thereof, refer to the corresponding method embodiments. It is not repeatedly mentioned here.

In addition, according to the embodiment of the present invention, an electronic device is further provided, the electronic device includes a processor and a memory, at least one command or at least one program is stored in the memory, and the at least one command or the at least one program is loaded and executed by the processor, thereby implementing the method provided in the above embodiment.

The memory may be used to store a software program and a module. The processor executes various functions and data processing by executing the software program and the module stored in the memory. The memory can mainly include a program storage area and a data storage area, in which the program storage area can store an operating system, an application program necessary for a function, and the like, and the data storage area can store data newly created according to use of the device, and the like. In addition, the memory may include a high-speed random access memory, or may further include a nonvolatile memory. For example, at least one magnetic disk storage, a flash memory device, or another volatile solid-state storage may be included. Accordingly, the memory may further include a memory control device, so as to provide access to the memory of the processor.

Figure 13:
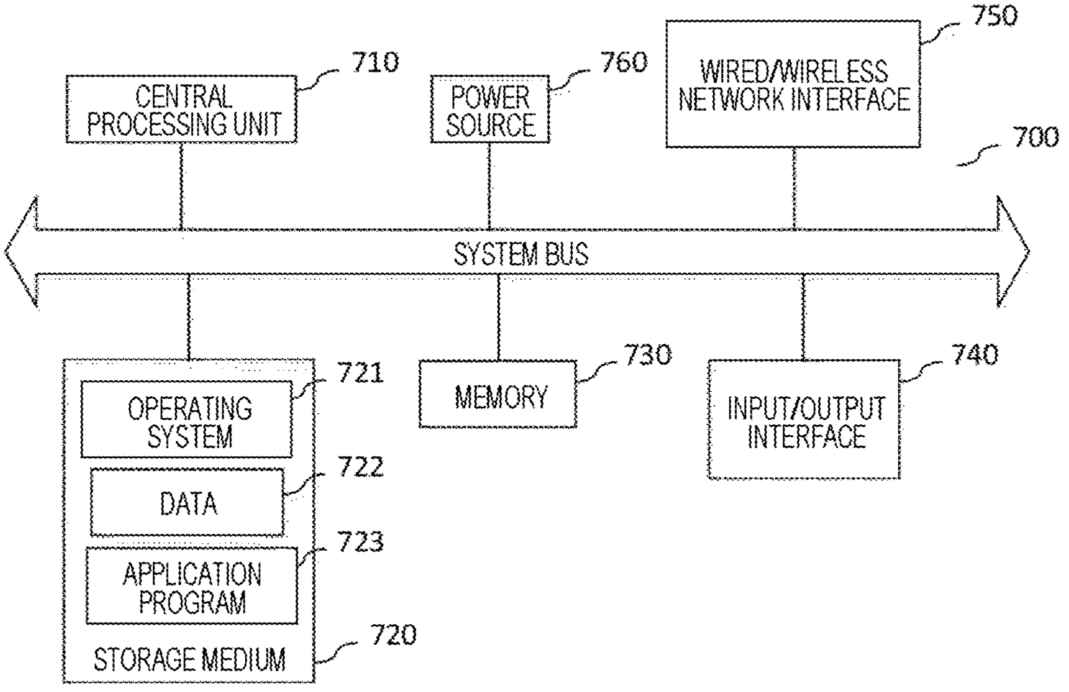
FIG. 13 is a diagram illustrating a structure of an electronic device provided by an embodiment of the present invention.

The method embodiments provided by the embodiment of the present invention can be executed by a terminal, a server, or a similar arithmetic apparatus, that is, the electronic device may include a terminal, a server, or a similar arithmetic apparatus. As illustrated in FIG. 13, a schematic configuration diagram of the server of the method of controlling the autonomous driving vehicle in the restricted area is illustrated using the method executed by the server as an example. The servers 700 can vary relatively widely in arrangement or performance, and may include one or more central processing units (central processing unit (CPU)) 710 (for example, one or more processors) and a memory 730, and a storage medium 720 (for example, one or more high-capacity memories) that stores one or more application programs 723 or data 722. Therein, the memory 730 and the storage medium 720 may be transient memory or persistent memory. The program stored in the storage medium 720 may include one or more modules, and may include an operation for a series of instructions in the server for each module. Still further, the central processor 710 is installed to communicate with the storage medium 720, and can execute a series of instruction operations in the storage medium 720 in the server 700. The server 700 may further include one or more power sources 770, one or more wired or wireless network interfaces 750, one or more input/output interfaces 740, and/or one or more operating systems 721, for example, Windows Server™, Mac OS X™, Unix™, Linux™, FreeBSD™, and the like.

The input/output interface 740 can be used to transmit and receive data via one network. Specific illustrative examples of the above networks may include wireless networks provided by a communication supplier of the server 700. In an illustrative example, the input/output interface 740 may include one network adapter (network Interface controller (NIC)) to communicate with the Internet by connecting to other network devices via a base station. In an illustrative example, input/output interface 740 may be a radio frequency (RF) module and may be used to communicate with the Internet in a wireless manner, wherein the wireless communications may use any of communications standards or protocols, including but not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

A person skilled in the art may understand that the structure shown in FIG. 13 is only a schematic diagram, and the server 700 may further include more or less modules than those shown in FIG. 13, or may have a different arrangement from that shown in FIG. 13.

An embodiment of the present invention further provides a computer-readable storage medium. The computer-readable storage medium may be installed in an electronic device to store at least one instruction or at least one program related to implementation of the method. The at least one command or the at least one program is loaded and executed by the processor to implement the method of controlling the autonomous driving vehicle in the restricted area.

Preferably, in the embodiment of the present invention, the storage medium may include a medium capable of storing various program codes, such as a USB flash disk, a read-only memory (ROM), a random access memory (RAM), a portable hard disk, a magnetic disk, or an optical disc, but is not limited thereto.

An embodiment of the present invention further provides a computer program product or a computer program. The computer program product or the computer program includes a computer instruction and the computer instruction is stored in a computer-readable storage medium. The processor of the computer device reads the computer instruction from the computer-readable storage medium, executes the computer instruction, and causes the computer device to execute the method of controlling the autonomous driving vehicle in the restricted area provided in the above various preferred embodiments.

Note that the order before and after the embodiments of the present invention is only for description, and does not indicate superiority or inferiority of the embodiments. And, specific embodiments of the present specification have been described above. Other embodiments are within the scope of the appended claims. In some instances, the claimed operations or steps can be performed in a different order than in the embodiments and still achieve desirable results. In addition, it is not always possible to realize a desirable result only by obtaining the specific order or the continuous order illustrated in the drawings. In certain embodiments, multitasking and parallel processing are also possible or advantageous.

Any of the embodiments in the present specification is described in a progressive manner, and the same and similar parts between the embodiments may be referred to each other. The description which is different from description of another embodiment has been given focusing on each of the embodiments. Specifically, the apparatus embodiment is almost similar to the method embodiment, so that the description is relatively simple, and for the relevant portion, the description of the portion of the method embodiment may be referred to.

A person skilled in the art may understand that, to implement all or some steps in the foregoing embodiments, the steps may be completed through hardware, or may be completed by instructing related hardware through a program, the program may be stored in a computer-readable storage medium, and the foregoing storage medium may be a read-only memory, a magnetic disk, an optical disc, or the like.

The above is only preferred embodiments of the present invention, and it is not intended to limit the present invention. Various modifications, equivalent replacements, improvements, and the like are included in the protection scope of the present invention without departing from the spirit and principle of the present invention.

The invention claimed is:

1. A method of controlling an autonomous driving vehicle in a restricted area for a control center to adjust traveling of the autonomous driving vehicle, the method comprising:

acquiring state information of a moving object in the restricted area, the moving object including a non-autonomous moving object and an autonomous driving vehicle, the non-autonomous moving object including a pedestrian and/or a non-autonomous driving vehicle, the state information including motion information and position information, the motion information including a motion direction and a motion speed, wherein the acquiring includes:

(i) acquiring the position information of the moving object at different times and a corresponding time at predetermined time intervals; and (ii) determining the motion information of the moving object based on k-th position information of the moving object and a k-th corresponding time that are acquired at a current time, and (k−1)-th position information of the moving object and a (k−1)-th corresponding time that were acquired last time;

determining, based on state information of each of the moving objects, a temporary restricted passage space corresponding to the each moving object; and adjusting, based on state information of a current autonomous driving vehicle and a temporary restricted passage space corresponding to each of all other moving objects, traveling of the current autonomous driving vehicle.

2. The method according to claim 1, wherein the acquiring state information of the moving object in the restricted area includes acquiring position information about a position where the moving object is currently located and a corresponding time, and calculating state information of the moving object at a future predetermined time based on a Kalman filter.

3. The method according to claim 1, wherein the motion information further includes a motion acceleration, and wherein the method includes determining state information of the moving object based on position information of the moving object and a corresponding time that were acquired three times including a current time.

4. The method according to claim 1, wherein the determining, based on state information of each of the moving objects, a temporary restricted passage space corresponding to the each moving object includes:

determining a motion trajectory of the each moving object combined with map information in the restricted area based on the motion information; and determining, with position information of the moving object as a start point and a predetermined position after operating for a predetermined time at the motion speed toward the motion direction along the motion trajectory as an end point, the temporary restricted passage space based on the start point and the end point.

5. The method according to claim 1, wherein the determining, based on state information of each of the moving objects, a temporary restricted passage space corresponding to the each moving object includes:

determining a motion trajectory of the each moving object combined with map information in the restricted area based on the motion information; and determining, with position information of the moving object as a start point and a place that is away forward by a predetermined distance toward in the motion direction along the motion trajectory as an end point, the temporary restricted passage space based on the start point and the end point.

6. The method according to claim 1, wherein the method includes:

determining a time information correspondence relationship between the moving object and the control center;

determining whether there is a communication failure based on the time information correspondence relationship and position information of the moving object and a corresponding time that were acquired last time, the communication failure including a communication delay or communication interruption;

determining a length of an elapsed time of the communication failure when it is determined that the communication failure exists; and correcting the temporary restricted passage space based on the length of the elapsed time of the communication failure and adjusting traveling of the autonomous driving vehicle based on the corrected temporary restricted passage space.

7. The method according to claim 6, wherein the correcting the temporary restricted passage space based on the length of the elapsed time of the communication failure includes:

determining, with a position corresponding to position information of the moving object acquired last as a start point, a predicted motion distance based on the length of the elapsed time and a motion speed of the moving object; and determining a space from the start point with the predicted motion distance as a radius and correcting the temporary restricted passage space.

8. The method according to claim 7, wherein the method includes determining a space along the motion direction with the predicted motion distance as a radius and setting the space as the restricted area.

9. The method according to claim 6, the state information further including identification information, the identification information including a type of a moving object, a credit rank, the method further comprising correcting the restricted area based on the identification information.

10. The method according to claim 9, further comprising correcting the restricted area based on an environmental condition and/or a date attribute, wherein the environmental condition includes a weather condition, a lighting condition, and a road condition, and the date attribute is a working day or a holiday/day off.

11. The method according to claim 1, wherein the adjusting traveling of the current autonomous driving vehicle based on the temporary restricted passage space and the state information of the current autonomous driving vehicle includes stopping the current autonomous driving vehicle until the temporary restricted passage space is removed when it is determined that the temporary restricted passage space exists at a predetermined distance in a forward direction based on the state information of the current autonomous driving vehicle.

12. The method according to claim 1, wherein the adjusting traveling of the current autonomous driving vehicle based on the temporary restricted passage space and the state information of the current autonomous driving vehicle includes determining whether the moving object or a shielding object exists in the temporary restricted passage space in a case where the temporary restricted passage space exists at a predetermined distance in a direction in which the current autonomous driving vehicle moves forward, and in a case where the moving object and the shielding object do not exist, causing the autonomous driving vehicle to continue to pass, or in a case where the moving object or the shielding object exists, stopping the current autonomous driving vehicle until the temporary restricted passage space is removed.

13. The method according to claim 12, wherein the determining whether the moving object or the shielding object exists in the temporary restricted passage space includes:

acquiring detection information of a sensor of the autonomous driving vehicle, the sensor of the autonomous driving vehicle being any one or several types of a camera, a radar, and a laser radar; and detecting an obstacle based on the detection information and determining whether the moving object or the shielding object exists in the temporary restricted passage space.

14. An electronic device comprising a processor and a memory, wherein the memory stores at least one instruction or at least one program, and the at least one instruction or the at least one program is loaded and executed by the processor to implement the method according to claim 1.

15. A computer-readable storage medium, wherein the computer-readable storage medium stores at least one instruction or at least one program, and the at least one instruction or the at least one program is loaded and executed by a processor to implement the method according to claim 1.

16. A control apparatus for an autonomous driving vehicle in a restricted area, the control apparatus comprising a processor configured to:

acquire state information of a moving object in the restricted area, the moving object including a non-autonomous moving object and an autonomous driving vehicle, the non-autonomous moving object including a pedestrian and/or a non-autonomous driving vehicle, the state information including motion information and position information, the motion information including a motion direction and a motion speed, wherein the processor is configured to (i) acquire the position information of the moving object at different times and a corresponding time at predetermined time intervals, and (ii) determine the motion information of the moving object based on k-th position information of the moving object and a k-th corresponding time that are acquired at a current time, and (k−1)-th position information of the moving object and a (k−1)-th corresponding time that were acquired last time;

determine a temporary restricted passage space based on state information of the moving object; and adjust, based on the temporary restricted passage space and state information of a current autonomous driving vehicle, traveling of the current autonomous driving vehicle.

* * * * *